Nov. 3, 1931.   C. CONE ET AL   1,829,738
APPARATUS FOR PRODUCING SHEET GLASS
Filed Feb. 14, 1929   6 Sheets-Sheet 1

Inventor
Carroll Cone
Edwin A. Rosin
By Frank Fraser
Attorney

Patented Nov. 3, 1931

1,829,738

UNITED STATES PATENT OFFICE

CARROLL CONE AND EDWIN A. ROSIN, OF TOLEDO, OHIO, ASSIGNORS TO LIBBEY-OWENS-FORD GLASS COMPANY, OF TOLEDO, OHIO, A CORPORATION OF OHIO

APPARATUS FOR PRODUCING SHEET GLASS

Application filed February 14, 1929. Serial No. 339,783.

The present invention relates to an improved apparatus for producing sheet glass.

In accordance with the present invention, a machine has been developed capable of constantly producing a flat sheet of substantially predetermined thickness which is uniform throughout. Although this apparatus is not of necessity so limited, nevertheless it has been primarily designed for use in the production of plate glass blanks. The expression "plate glass blank" is used to designate a flat sheet of glass which is to be subsequently surfaced as by grinding and polishing its surfaces. The finished sheet thus formed is known in the art as "plate glass". The manufacture of plate glass entails the expense of considerable time and money. In addition to making the blanks from the molten glass, it is necessary to subject the surfaces of such blanks to the action of various grades of abrasive material and then to the action of suitable polishing material. Obviously, there is a certain amount of breakage that takes place during the grinding and polishing operations. The length of time required, particularly in the grinding operation, is dependent to a considerable degree upon the thickness and uniformity of thickness of the blank being worked upon. Quite obviously, a blank irregular in thickness will require considerably more time than a blank which is substantially uniform in thickness.

The present apparatus is designed to actually roll molten glass to a substantially predetermined and uniform thickness. Generally speaking, a pair of cylindrical bodies are suitably disposed above a mass of molten glass and arranged to create a sheet forming pass therebetween. The molten glass is advanced through the sheet forming pass and is there reduced to a sheet whose thickness is dependent upon the space between the peripheries of the rolls at their line of closest approach. Although it would seem a simple matter to advance molten glass through the sheet forming pass created between the rolls, it is nevertheless difficult to continuously roll molten glass to the desired type of sheet. In the present apparatus, the rolls are so mounted that one of them may be moved relative to the other, not only to permit the production of various thicknesses of sheets, but also to automatically allow the passage of foreign matter between the rolls when occasion demands. The rolls are so mounted and driven that they can be separated one from the other without affecting the linear velocity of the rolls. Suitable counterweight linkage is associated with the rolls to permit the movable rolls to be locked in open position whenever desired. The linkage mechanism is also of such nature that the rolls can be adjusted without affecting the drive mechanism therefor.

The apparatus is also designed to permit longitudinal, transverse and vertical adjustment thereof with respect to the source of molten glass from which the sheet is produced.

In addition to the above-named objects, it is a further object of this invention to provide such an apparatus wherein a pair of cylindrical bodies, such as rolls, may be arranged above a mass of molten glass with the lower portions of the peripheries of the rolls substantially in contact with the surface of the molten glass over which the rolls are positioned, the said rolls being so placed with respect to each other that a sheet forming pass is formed therebetween, the molten glass thereunder being moved upwardly through the pass and reduced to a sheet of substantially uniform and predetermined thickness, the apparatus also including preferably, although not necessarily, a third roll arranged above the sheet forming pass and over which the sheet is deflected into a horizontal plane, the sheet then being carried forward by means of a flattening table upon which the sheet rests during the flattening period thereof, after which the sheet is passed through an annealing leer.

Other objects and advantages of the invention will become more apparent during the course of the following description when taken in connection with the accompanying drawings.

In the drawings wherein like numerals are employed to designate like parts throughout the same.

Figure 1:
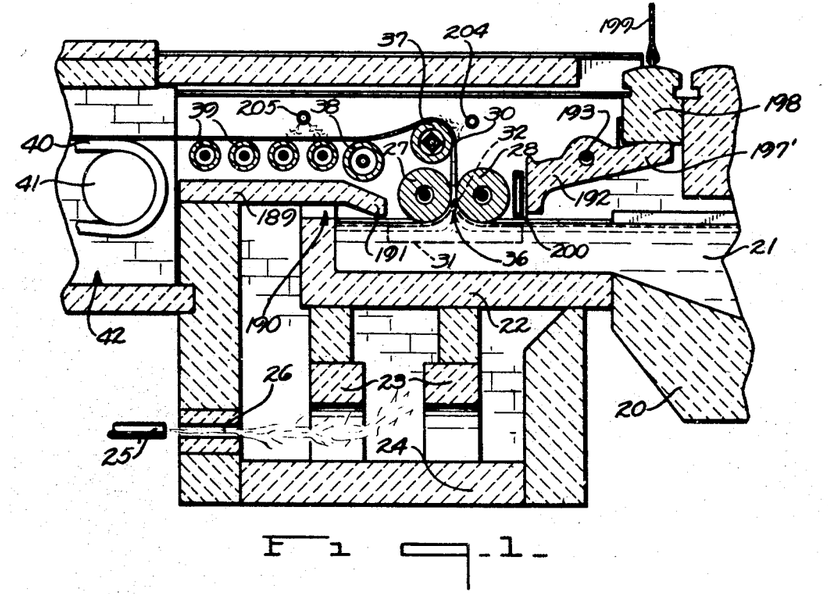
Fig. 1 is a fragmentary vertical sectional view through the molten glass receptacle showing diagrammatically a sheet forming mechanism.

Referring to Fig. 1, the numeral 20 designates a tank furnace adapted to contain a mass of molten glass 21 which may be continuously supplied to the working receptacle 22. The working receptacle 22 is supported on stools 23 contained in a chamber 24, the temperature of which may be controlled by means of burners or the like 25 operating through ports 26. The working receptacle or pot 22 is preferably designed to contain a relatively shallow mass of molten glass, although, of course, this invention is in no way limited to the quantity of molten glass contained in this pot.

Positioned transversely of the pot 22 is a pair of rolls 27 and 28 respectively. The rolls are preferably so formed that the largest portion or sheet forming parts thereof are slightly shorter than the inside width of the working receptacle. The main or body portions of the rolls are carried by reduced ends 29 shown in Fig. 6 which will be more fully explained hereinafter. The rolls are thus formed so that the lower peripheries thereof may be arranged within the pot, that is, between the side walls of said pot in a manner that they contact with the surfaces of the molten glass. As shown in Fig. 1, the lower peripheries of the rolls are in the same horizontal plane as the surface of the mass of molten glass 21. It will also be noted that the upright walls of the pot terminate in a plane slightly higher than the surface of such glass. It has been found in actual practice that a condition where the lower peripheries of the rolls touch the surface of the molten glass, very excellent results are obtained, although, of course, the rolls may be adjusted up or down as desired, so it will therefore be appreciated that it is not imperative that there is contact between the rolls and molten glass in the pot.

To prevent large and thickened cold edges from being formed on the sheet of glass 30, edge blocks 31, shown in dotted lines in Fig. 1, are placed in the glass along the sides of the pot 22 and under the ends of the main body portions of the sheet forming rolls. These blocks may be formed from a refractory clay or the like and are preferably provided with an upwardly extending portion 32, the shape and size of which is dependent upon the diameter of the forming rolls 27 and 28. It is also preferred that the edge blocks 31 be so mounted that they may float vertically in the molten glass, being retained against accidental displacement away from the sides of the pots by rods, hooks, or other similar devices. It will be appreciated that the edge blocks 31, in effect, cut down the width of the pot beneath the forming rolls. As will be pointed out more fully hereinafter, the molten glass is actually rolled into a sheet in contra-distinction to a drawing operation, and it has been found that in the absence of the blocks 31 that the glass will be extruded or forced outwardly from the main body portions of the roll whereby to form or allow the creation of relatively thick heavy cold edges on the glass sheet. The cold edges are objectionable because they oftentimes are sufficiently set to separate the forming rolls, thus preventing proper formation of the sheet and the edges are also objectionable from a flattening and an annealing standpoint. When using the edge blocks 31 of proper width, however, the molten glass will not extend beyond the major portions or glass contacting portions of the rolls so that no thickened edges are formed on the glass sheet. As a matter of fact, the edges formed on the sheet, when the edge blocks are used, are uniformly straight longitudinally of the sheet, and are smooth and rounded. Strips cut from the edges of such a sheet find a ready market as shelving because of the smooth rounded edges and also because of the thickness of the glass which makes it sufficiently strong to act in the capacity of a shelf. As has been pointed out, the upper face of each edge block is so curved or shaped that the block can nest in between the rolls as will be clearly understood.

Although the present invention is directed to the apparatus designed to support the rolls and associated parts, the use of the edge blocks has been mentioned to facilitate a better understanding of the use to which applicant's invention is to be put. Generally speaking, the rolls are positively driven and so mounted with respect to each other that they actually roll the molten glass into the sheet 30. A heavy meniscus or source of supply 36 furnishes sufficient glass to the sheet forming pass between the rolls to allow an actual rolling in contra-distinction to a drawing operation such as in the use of a Colburn machine well known in the glass art.

In one embodiment of the invention, the sheet 30 is moved vertically from the sheet forming pass and is adapted to be deflected over a third roll 37. As shown, the roll 37 is positioned in a relatively higher horizontal plane than the roll 38 and the series of rolls 39. The roll 38 is so mounted that its uppermost portion will be in the same horizontal plane as the upper portions of the rolls 39 and is of sufficient size that it can be used as a deflecting roll if desired; that is, the sheet, instead of being trained about the roll 37, can be deflected over the forming roll 27 and passed directly to the roll 38. Adjacent the series of rolls 39 is a flattening table 40 consisting preferably, although not necessarily, of a plurality of pivotally associated links arranged in an endless belt formation. This table may be run by means of a sprocket, not shown, similar to the idler sprocket 41.

The flattening table 40 is preferably arranged in a temperature controlled compartment 42. The sheet passes from the flattening table 40 into and through an annealing leer.

Figure 5:
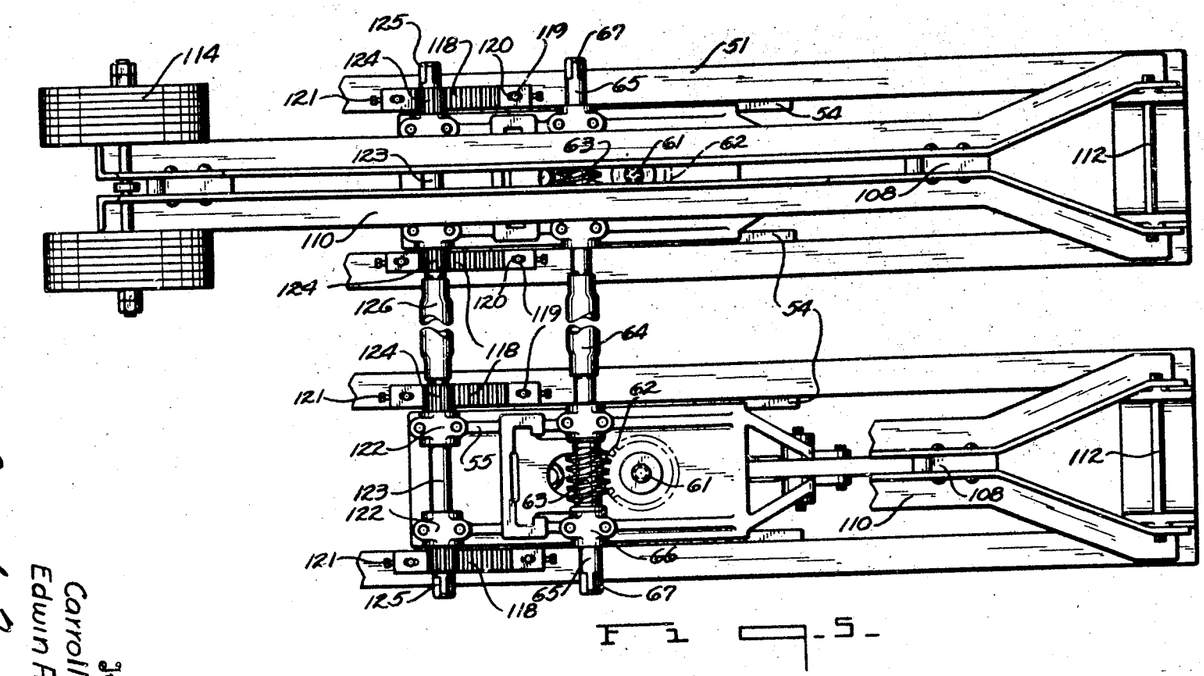
Fig. 5 is a top plan view illustrating a portion of the adjusting and supporting mechanism for the apparatus.
Figures 6, 11:
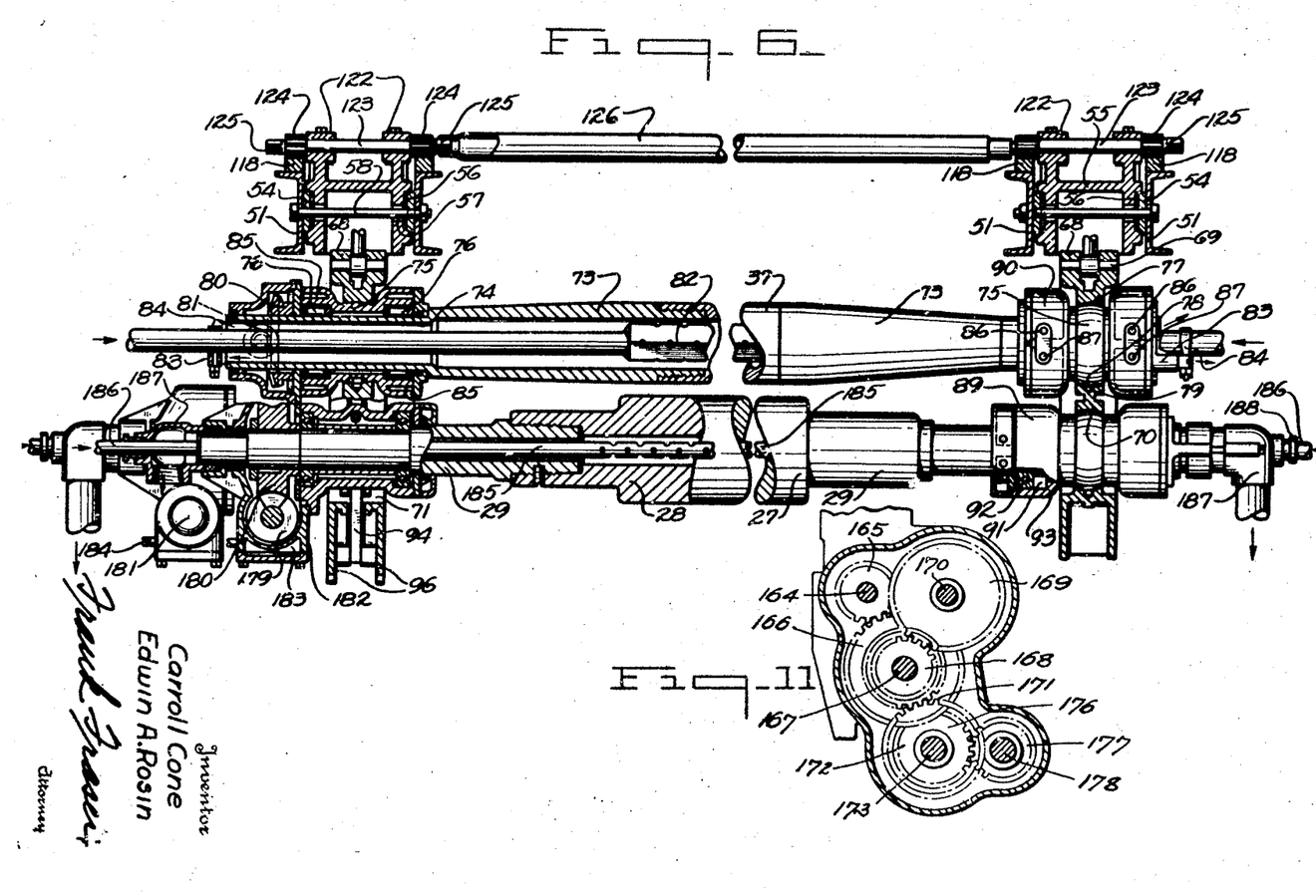
Fig. 6 is an end elevation, partially in section, of the rolls and mounting therefor.
Fig. 11 is a diagrammatic view illustrating a portion of the gearing mechanism.
Figure 7:
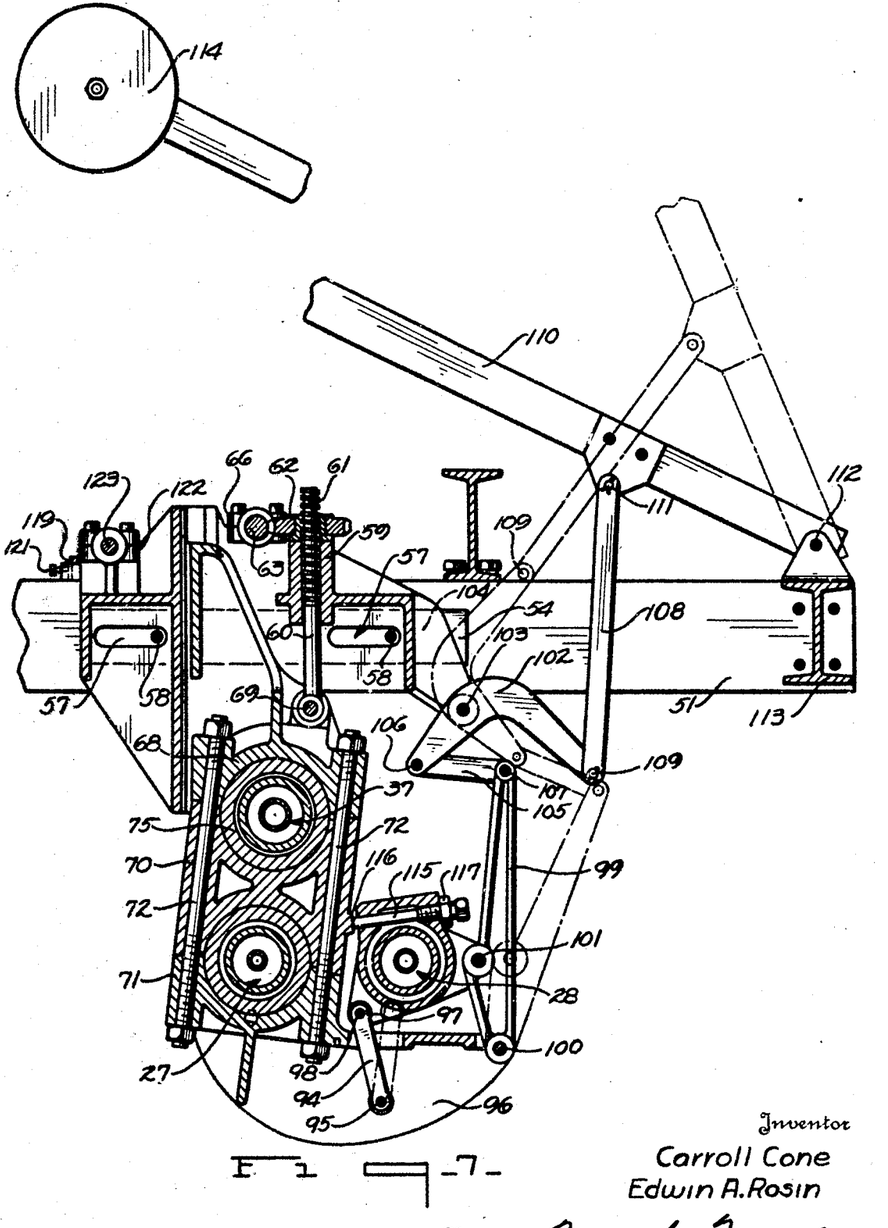
Fig. 7 is a transverse section through the rolls illustrating the linkage support therefor.

The above gives generally the formation of the sheet and the manner in which it is handled after its formation to render it capable of being used. Due to the type of rolling mechanism employed, rolls 39 and flattening table 40, the finished annealed sheet will be substantially of a uniform and predetermined thickness. The annealing of the sheet is of such character that the sheet can be subsequently ground and polished to give finished plate glass. Figs. 3, 5, 6 and 7 set out more in detail the construction and operation of our improved sheet forming mechanism. Mounted longitudinally of the working receptacle and in spaced relation thereabove are channel irons or C beams 51. The ends of the C beams are supported on the vertical metallic supports 52 shown in Fig. 3, and at their opposite ends on the member 53 also shown in Fig. 3. Arranged inwardly of the pair of C beams 51, as shown in Fig. 6, are slides 54 on which is adapted to slide a casting 55 provided with runways 56 for the reception of the slide members 54. Each casting has transverse openings 57 formed therethrough and through which passes a bolt 58, the bolt 58 preventing separation of the C beams 51. The apertures 57 are elongated as shown in Fig. 7 so that the casting can be moved longitudinally of the machine within certain limits depending upon the length of the openings 57.

As shown in Fig. 7, each casting carries a sleeve member 59 through which extends an eye-bolt 60 which is provided with a threaded end 61 working through a worm wheel 62 which meshes with a worm 63. Fig. 5 shows how a worm is provided for both worm wheels, the worms being connected by a member 64. The worms 63 are carried on suitable shafts 65 journaled in the bearings 66 and terminating in the angular ends 67 to permit the use of a crank or the like thereon so that both worms can be rotated simultaneously from either side of the machine. Upon rotation of either of the shafts 65, both worms will be rotated, which in turn operate the worm wheels 62, thereby raising or lowering the eye-bolts 60 depending upon the direction of rotation of the said shaft.

Each eye-bolt supports a depending casting 68 by means of a cross pin 69 extending through the eyebolt and through apertured ears on the casting. Two additional members 70 and 71 are also carried by the eye-bolts 60, the pieces 68, 70 and 71 being tied together by means of bolts 72. These three pieces form supports for the rolls 27 and 37. The upper roll 37 is carried by the end members 73 shown in Fig. 6, and the end members 73 are either screw-threadedly associated with the main portion of the rolls or assembled by means of a shrink fit or the like. The ends 73 terminate in the reduced portions 74 journaled through the bearing members 75 which are relatively long and provided with two series of roller bearings 76. As indicated at 77, the castings or members 68 and 70 are curved to receive the rounded portion 77, the lower part of which is slotted at 78 for the reception of a pin 79 carried by the casting 70. By rounding the parts as shown and by means of the pin 79 operating in the slot 78, the roll can automatically align itself and yet, because of the pins 79, the bearing housings cannot rotate, so that the drive shafts and inlet and outlet conduits will not be misaligned.

A gear 80 is keyed to the reduced end 74 and by means of a drive gear 81, the gear 80 and therefore the roll 37 are positively rotated. Arranged through the roll 37 is a perforated pipe 82 supported at its ends by bars 83 held in position by means of U bolts 84. Air is preferably introduced in the apertured conduit at both ends, passing through the apertures and acting upon the interior of the roll 37, then passing between the interior of the roll and the conduit 82 and exhausting from the open ends of the roll. The size of the conduit at its ends is sufficiently small with respect to the bore of the roll to permit the escape of air from the ends as shown and described. The bearings 75 are provided with passageways 85 through which cooling medium may be circulated by being introduced through conduit 86 and exhausted through pipes 87. This arrangement is clearly shown to the right of Fig. 6.

The support for the forming roll 27 is similar to the support for the roll 37 except that water is preferably used as a cooling medium. Referring to the right hand side of Fig. 6, it will be seen that the chamber 89 is relatively longer than the chamber of the bearing housing at the opposite end of the roll, leaving a gap 91 between the end of bearing 92 and the upstanding portion 93 of said chamber to take care of expansion and contraction longitudinally of the roll.

The roll 27 is preferably a stationary roll during the rolling operation, although of course it is rotatable about its axis and is adjustable with respect to the mass of molten glass from which the sheet is produced. The roll 28, however, is preferably adjustably mounted with respect to the roll 27. As is clearly shown in Fig. 7, a link 94 is pivotally mounted by means of a pin 95 between the ends 96 of the bracket or portion 71. The link 94 is likewise pivotally connected to a mounting 97 for the roll 28, the mounting including an ear through which a pin 98 extends. A second link 99 is pivotally connected at 100 to the ends 96 and is also pivotally connected to the support 97 by means of a pin 101. A bell crank 102, pivoted at 103 to the projection 104, is connected to the upper end of the link 99 by member 105, being pivoted to the bell crank by pin 106 and to the link 99 by pin 107. A connector 108 is pivotally associated with the bell crank as at 109 and is also pivotally connected to a beam 110 at 111. The beam 110 is pivotally supported at 112 on the cross beam 113, while the opposite end of the beam is adapted to support removable weights 114. With the type of linkage described and when it is arranged in the position illustrated in heavy lines in Fig. 7, the roll 28 is urged toward the roll 27 because of the position of the pivot points between the links. An adjustable screw 115, bearing against a boss 116 on the casting 70, controls the space or width of the sheet forming pass between the rolls 27 and 28 and thus the thickness of sheet formed. By proper contact of the lock nut 117, any desired adjustment can be had and maintained.

By mounting the adjustable roll 28 in this manner, it can be forced away from the stationary roll 27 to permit the passage of foreign matter, such as clay or exceptionally cold glass, between said rolls. Ordinarily, however, the weight 114 is such that the roll 28 will be urged toward the roll 27 as close as the adjustment of the screw 115 will permit and thus reduce the molten mass to a rolled sheet of glass. As above stated, it is only in exceptional cases when the roll 28 is automatically forced away from the roll 27. If for any reason it is desired to hold the roll 28 away from the roll 27, the beam 110 is raised upwardly moving the linkage in a position indicated in dotted lines in Fig. 7. When the parts assume this position, the roll will not accidentally go back into operative position, thus lending a safety factor to the machine. In fact, the roll will be held in an inoperative position until purposely moved into an operative position by tapping or pushing the linkage at the pivot point 109 which will cause the parts to assume the position illustrated in full lines. It will thus be seen that the counterweight linkage just described allows the front roll 28 to be locked in open position.

To adjust the mechanism longitudinally of the working receptacle, a plurality of rack bars 118 are adjustably bolted on the C beams 51. The rack bars are held in position by means of bolts 119 extending through the elongated slots 120 in said racks, while the screws 121 may be adjusted after the bolts 119 are loosened so that the rack bars may be suitably lined up. Each of the castings 55 is provided with a plurality of journals 122 through which a transversely arranged shaft 123 extends. Each shaft carries a pair of gears 124 which mesh with its respective rack bar 118. The ends of the shaft 123 are provided with faces 125 so that the inwardly extending ends of the shafts may be connected by means of a tubular member or the like 126 shown clearly in Fig. 5 of the drawings. A wrench crank or the like may be placed on either of the outwardly extending ends of the shafts whereby to rotate the same and to cause movement of the mechanism longitudinally of the draw-pot. As above pointed out, the castings 55 slide upon the members 54 carried by the C beams 51. The castings are movable along the slide within the limits permitted by the elongated openings 57 formed in the castings and through which openings extend the bolts 58.

Figure 2:
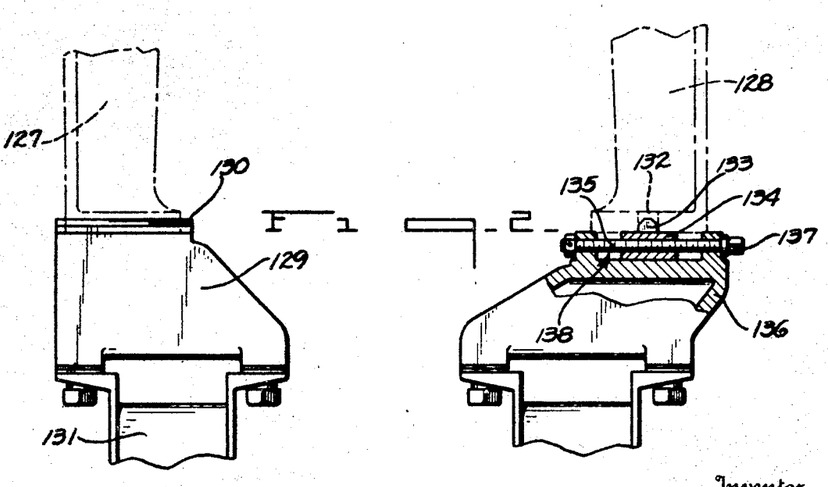
Fig. 2 is an elevation of a portion of the adjusting mechanism for the apparatus.
Figures 3, 4:
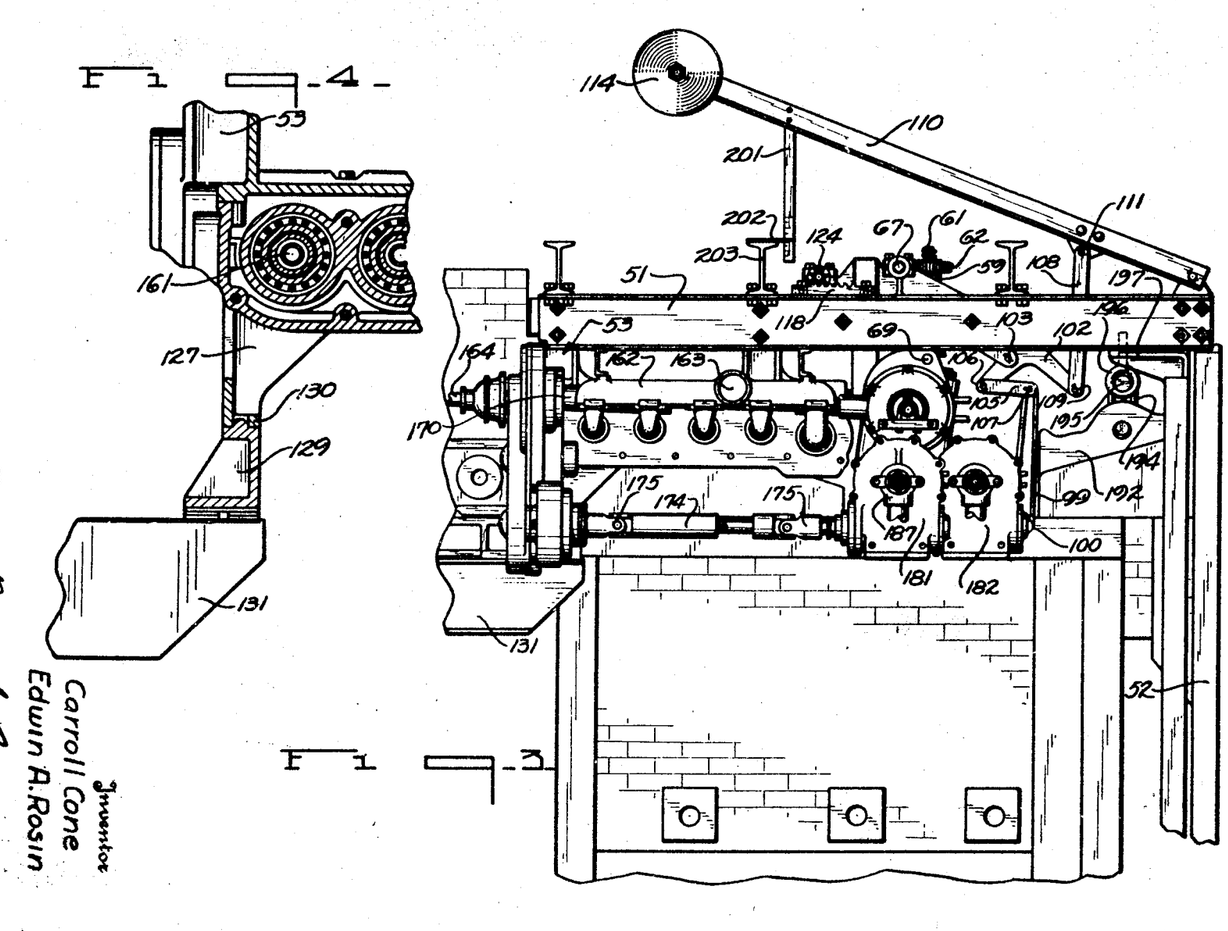
Fig. 3 is a fragmentary elevation of the apparatus.
Fig. 4 is a fragmentary detail of a portion of the machine.

Referring to Figs. 2 and 4, it will be seen that the portion or member 53 supporting one end of the machine is carried by a foot 127. As a matter of fact, there are two feet 127 and 128 as shown in dotted lines in Fig. 2. The foot 127 rests upon the support 129, the foot being provided with a groove extending transversely of the machine in which is received a slide 130 carried by the support 129 on the frame-work 131.

The foot 128 is provided with an aperture 132 in which is received a lug 133 carried by the block 134 which is provided with an internally threaded bore through which extends a threaded shaft 135. The shaft is journalled through the support 136 and is provided with a flattened end 137, whereby to permit the use of a crank or other operating means for rotating the shaft which will move the block 134 within the recess 138. As the block 134 carries the upwardly extending projection which is received within the foot 128, the entire machine is moved transversely of the draw-pot. The foot 127 merely slides back and forth depending upon the direction of rotation of the threaded shaft 135.

Figure 8:
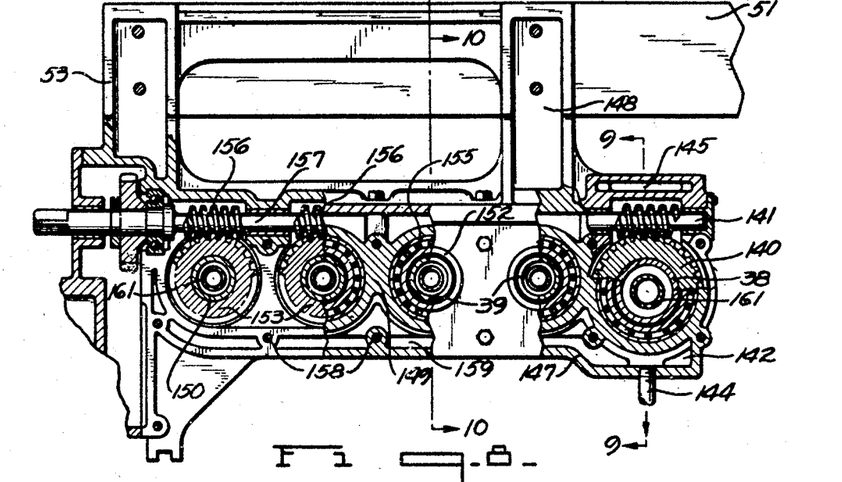
Fig. 8 is a fragmentary sectional detail showing the support and drive for the rolls which support the sheet after it has been deflected into a horizontal plane.
Figures 9, 10:
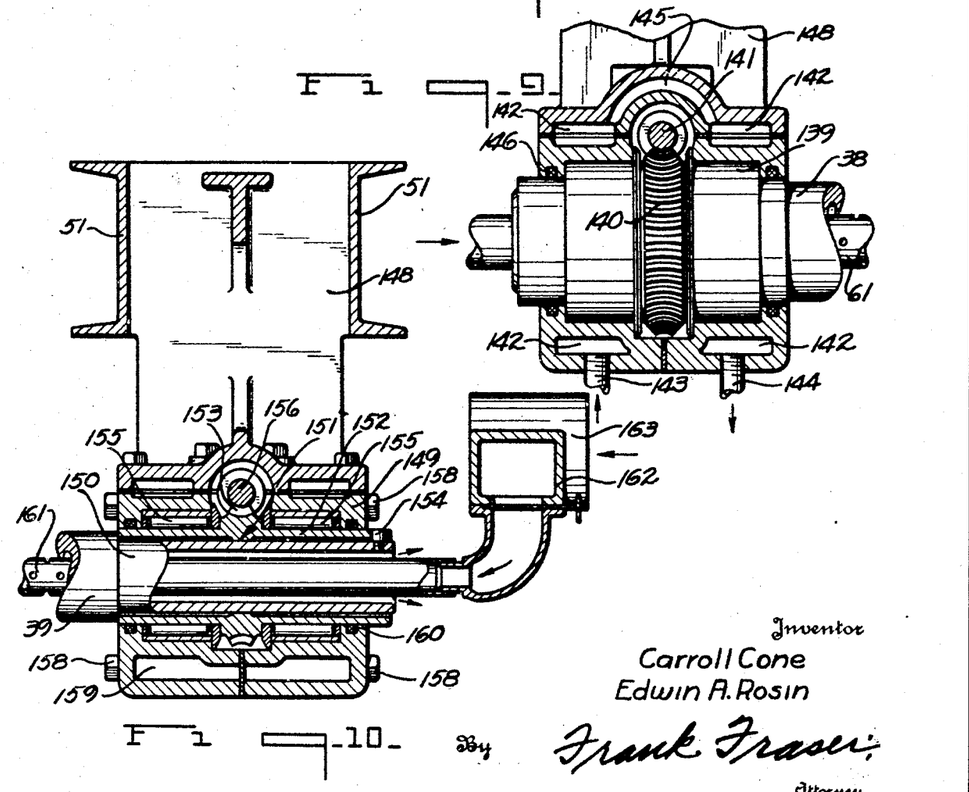
Fig. 9 is a section taken on line 9—9 in Fig. 8.
Fig. 10 is a section taken on line 10—10 in Fig. 8.

As has been pointed out above, the sheet moves over a series of rolls 39. Figs. 8, 9 and 10 more clearly set forth the mounting and operation of these rolls. The first roll 38 is shown in Fig. 9 and has at its end an enlarged portion 139 carrying a worm wheel 140 driven by means of a worm 141. Passages 142 surround the gear and end 139 of the roll, which passages are adapted to receive a temperature control medium through the conduit 143 and is discharged through the conduit 144. The passages 142 are annular, being connected a their upper ends by the curved passage 145 so that the temperature control medium goes in the pipe 143, around through the passage 142, through the curved passage 145, and then around the casing and through the exit conduit 144. Suitable packing 146 is provided to prevent oil leakage from the bearings as will be readily understood.

The roll 38 and rolls 39 are all supported in a frame 147 carried by the depending arms 148 bolted to the C beams 51. The rolls 39 are journaled through the members 149. Each roll 39 terminates in a reduced end portion 150 which rests on the annular ridge 151 which is a portion of a sleeve 152 which also is provided with a worm wheel portion 153. The reduced end 150 and sleeve portion 152 are made to rotate together by reason of a bolt or screw 154. It will be seen, therefore, that the rolls are supported on the ridges 151. Preferably, two series of roller bearings 155 are provided as a support for the sleeve 152. A series of worms 156, carried on the drive shaft 157, mesh with the worm wheels 153 whereby to turn the same in a manner to rotate the rolls 39. It is to be noted that the housing 149 is in two sections, the sections being held together by means of bolts 158. A temperature control medium is circulated through the passages 159 formed in the journals as will be readily understood. Suitable packing 160 is provided to prevent leakage of lubricant (see Fig. 10).

As shown, perforated conduits 161 extend longitudinally through the rolls, the conduits 161 all communicating with a common valve controlled manifold 162 which receives air or other cooling medium through an intake 163. It is preferred that air be used and in such case the air passes inwardly of the rolls through the perforated conduits 161 and then leaves each roll between its conduit and the inner wall of such roll. The passage of the air from the roll is indicated by arrows in Fig. 10.

Referring to Figs. 3 and 11, the numeral 164 designates the drive shaft which is connected to a suitable source of supply. This source of supply may be through speed reducing mechanism, clutch mechanism, etc.

The shaft 164 carries a gear 165 which meshes with a gear 166 carried on the shaft 167. In addition to the gear 166, the shaft 167 has keyed thereon a gear 168 meshing with a gear 169 carried on the shaft 170, which shaft carries the gear 81 designed to rotate the roll 37. A third gear 171 is also carried on the shaft 167, which gear meshes with a gear 172 carried on the shaft 173. The shaft 173 is splined as at 174 shown in Fig. 3, and is provided with universal connections 175. The opposite end of the shaft carries a worm meshing with a gear on the roll 27 whereby to drive the same.

A second gear 176 is carried on the shaft 173 and rotates therewith, which gear meshes with and drives a similar gear 177 on the shaft 178. It is to be noted that shafts 173 and 178 rotate in opposite directions. The shaft 178 carries the worm 179 which drives the worm wheel 180 carried by the end of the roll 28. As the rolls 27 and 28 derive their rotation from the shaft 178 and 173 respectively, it will be seen that the two rolls 27 and 28 rotate in opposite directions, which of course is the desirable manner of driving the rolls. The worm and gear for driving the roll 27 are contained in the housing 181, and as shown in Fig. 6, the housing 181 extends outwardly further than the housing 182 containing the drive for the roll 28. Each housing is provided with channels 183 connecting to conduits 184 so that cooling means may be circulated around the gears, etc.

Referring again to the sheet forming rolls, it will be seen that the rolls are provided with internal perforated pipes 185, and it is preferred that cold water be circulated through the rolls to control the temperature. To this end, water is introduced within the ends 186 of the pipes 185, which pipes extend through the angle pieces 187 through which the discharging medium passes. A packing nut 188 is provided to prevent leakage. The water or other temperature control medium may be circulated through both ends of the pipe 185 simultaneously, the water discharging through the pipe and passing between it and the inner wall of the rolls, and then through the connections 187 as indicated by the arrow.

To protect the rolls 27 and 28 and the sheet formed thereby from heat, gases, etc., it is preferred that lip-tiles be used. At the closed end of the pot is a relatively flat tile 189 which may be supported upon one wall of the compartment 24 and on bricks 190 resting on the end of the draw-pot 22. The bricks or other refractory material 190 are arranged in spaced relations to leave space for the heated gases, etc. to pass under the tile and upon the glass at the closed end thereof. The end 191 of the tile 189 preferably terminates relatively close to the surface of the molten glass contained in the pot.

A water cooled shield can be used, or not, between the end 191 of the tile and the roll 27, as desired.

A second tile member 192 is suspended above the molten glass in advance of the roll 28, and this tile is mounted so that it can be adjusted vertically and longitudinally of the machine so that it will not interfere with such adjustment of the sheet forming apparatus. One method of supporting the tile consists in arranging a rod 193 transversely of the pot and through the tile, the rod 193 hanging on links 194 supported by a cross member 195, which in turn is suspended in eye-bolts 196. The eye-bolts 196 are provided with a plurality of openings through which a pin may be inserted. Bifurcated brackets 197 are carried by the frame-work 52, the eye bolts being received between the bifurcated ends of the brackets, which brackets terminate in upwardly extending portions at their outer ends to prevent accidental displacement of the pins extending through the eye-bolt shaft. By sliding the pins along the brackets the tile may be moved horizontally of the machine. The tile may be moved vertically by changing the location of the pins in the openings of the eye-bolt shaft.

Referring to Fig. 1, it will be noted that the end 197' of the tile 192 contacts with the vertically adjustable arch member 198 supported and adjusted through means of a cable, rods, or the like 199. By moving the arch construction 198 vertically, the tile 192 will be pivoted about the rod 193, thereby controlling the space between the lower edge of the tile and surface of the molten glass contained in the receptacle 22. A suitable shield 200 may be interposed between the tile and the roll 28 as illustrated.

In operation, the molten glass is produced in the tank furnace 20 and is adapted to be constantly supplied to the working receptacle over which the sheet forming rolls 27 and 28 are positioned. Due to the length of the major portion of the rolls, they may be arranged between the side walls of the working receptacle so that the lower peripheries thereof contact with the surface of the molten glass thereunder. By adjusting the screw 115 associated with the front roll 28, the gap or sheet forming pass created between the rolls can be accurately controlled and maintained. This gap creates a sheet forming pass through which the molten glass passes and is reduced to a flat sheet of substantially predetermined and uniform thickness. One of the important features of this apparatus is the linkage support for the adjustable roll 28. The linkage support is so constructed and mounted that the roll 28 can be varied with respect to the roll 27 without affecting the linear velocity thereof. The linkage may be considered a parallelogram linkage which keeps the drive worm always horizontal.

Due to the linkage support for the roll 28, it can be swung away from the stationary roll 27 automatically when clay or other thick bodies pass between the rolls. This separation is entirely automatic and the amount of force required to separate the roll 28 from the roll 27 is determined by the weight 114. This weight is preferably so controlled that if the rolls are temporarily separated by the cold glass sheets, they will immediately assume their intended positions when the cold glass or other matter has completely passed through the forming pass. The importance of this arrangement of the rolls is apparent when it is understood how easily the rolls may become warped. If the rolls were mounted in stationary brackets so that the sheet forming pass is fixed, there would be great danger of breaking or warping of the rolls due to clay and other things present in molten glass. In addition to the automatic feature due to the linkage support of the roll, the adjustable roll 27 may be manually placed in inoperative position by arranging the parts shown in dotted lines in Fig. 7. In this position the linkage is so counterweighted that the front roll is locked in open position. Although the roll is locked in this position and held against an accidental return to operative position, nevertheless it is a simple matter to move the linkage in a position illustrated in full lines in Fig. 7.

As shown in Fig. 3, a scale 201 is carried by the beam 110, the scale being suitably graduated and movable in proximity to a stationary pointer 202 carried on the eye-beam 203. The scale is so graduated that the operator can accurately determine the size of the sheet forming pass. Of course, the size of the sheet forming pass determines the thickness of sheet produced, and it is therefore desirable to know accurately exactly what relative position the roll 28 bears with respect to the roll 27.

The sheet forming rolls are preferably positively driven by the mechanism above described but rotated in opposite directions in a manner to positively feed the molten glass upwardly and to reduce it to sheet form. The sheet forming rolls are internally cooled to the extent that the sheet will not stick thereto. The sheet formed may be carried over the bending roll 37 or deflected to pass in an oblique path to the roll 38 and then over the rolls 39. Burner pipes 204 and 205 respectively are adjustably mounted and arranged preferably to play upon the border portions of the sheet which are normally the coolest, although obviously, the burners can be adjusted to act upon any part of the sheet desired. Due to the position of the floating edge blocks 31, relatively thick heavy cold edges are not formed on the sheet because no more glass is moved upwardly when using the edge blocks than can be actually rolled between the major portions or main body parts of the sheet forming rolls. The sheet is conveyed over the rolls 39 and upon a flattening table 40 which is positively driven at a speed to permit proper flattening of the sheet. The temperature of the compartment in which the flattening table is contained is so controlled that the sheet, if it is not already perfectly flat, can be flattened without difficulty. The sheet is then passed through an annealing leer to make it suitable for commercial use. To properly line up the sheet forming mechanism, it may be adjusted vertically, transversely, and horizontally with respect to the molten glass from which the sheet is produced.

Because of the unique arrangement of parts, the entire apparatus may be lifted as a unit very easily. To disconnect the driving mechanism, it is only necessary to separate the shaft 164. It is, therefore, possible to remove the machine from the working receptacle to make repairs, etc.

Due to the self-aligning features for the rolls, the front roll or adjustable roll 28 may be separated from the stationary roll 27 at one end only. That is, if a small piece of clay or other foreign matter passes between the rolls near their ends, the adjustable roll 28 may swing away from the stationary roll by reason of the self-aligning mounting for said rolls. If the roll 28 were mounted in a fixed bracket, the entire roll would have to swing away from the stationary roll to permit passage of such foreign matter. This is a decided improvement.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In sheet glass apparatus, a receptacle containing a mass of molten glass, a pair of rolls mounted thereover and arranged to create a sheet forming pass, one of said rolls being supported in a stationary mounting, linkage means for adjustably supporting the other roll with respect to the first, means for controlling the space between said rolls, and means for indicating the space between the rolls.

2. In sheet glass apparatus, a receptacle containing a mass of molten glass, a pair of rolls mounted thereover and arranged to create a sheet forming pass, one of said rolls being supported in a stationary mounting, linkage means for adjustably supporting the other roll with respect to the first, said second mentioned roll being carried at its ends in self-aligning supports whereby the adjustable roll may be moved away from the stationary roll by pivoting about either end or away from the stationary roll.

3. In sheet glass apparatus, a receptacle containing a mass of molten glass, a pair of rolls mounted thereover and arranged to create a sheet forming pass, one of said rolls being supported in a stationary mounting, linkage means for adjustably supporting the other roll with respect to the first, means for controlling the space between said rolls, a third roll supported in the stationary mounting and over which the sheet formed in the sheet forming pass is deflected into a horizontal plane, and a flattening table for receiving the sheet after it is deflected over said third mentioned roll.

4. In sheet glass apparatus, a receptacle containing a mass of molten glass, a pair of rolls mounted thereover and arranged to create a sheet forming pass, one of said rolls being supported in a stationary mounting, linkage means for adjustably supporting the other roll with respect to the first, means for controlling the space between said rolls, a third roll supported in the stationary mounting and over which the sheet formed in the sheet forming pass is deflected into a horizontal plane, and means for moving the three rolls as a unit longitudinally, transversely, and vertically with respect to the working receptacle.

5. In sheet glass apparatus, a receptacle containing a mass of molten glass, a pair of rolls mounted thereover and arranged to create a sheet forming pass, one of said rolls being supported in a stationary mounting, and counterweight linkage means for adjustably supporting the other roll with respect to the first, said counterweight linkage means being such that the movable roll may be moved away from the stationary roll and locked in such position.

6. In sheet glass apparatus, a receptacle containing a mass of molten glass, a pair of rolls mounted thereover and arranged to create a sheet forming pass, one of said rolls being supported in a stationary mounting, parallelogram linkage means for supporting the other roll in a manner that it will be free to automatically move toward and away from the stationary roll, means for limiting the approach of the adjustable roll with respect to the stationary roll, means for normally urging the adjustable roll toward the stationary roll as far as the adjustment of the last-mentioned means will permit, and drive means for said rolls, said parallelogram linkage means being of such nature that the adjustable roll can move to and from the stationary roll without affecting the drive therefor.

7. In sheet glass apparatus, a receptacle containing a mass of molten glass, a pair of rolls mounted thereover and arranged to create a sheet forming pass, one of said rolls being supported in a stationary self-aligning mounting, linkage means for adjustably supporting the other roll with respect to the first, and means for controlling the space between said rolls.

8. In sheet glass apparatus, a receptacle containing a mass of molten glass, a pair of rolls mounted thereover, and arranged to create a sheet forming pass, one of said rolls being supported in a stationary self-aligning mounting, linkage means for supporting the other roll in a manner that it may float toward and away from the first mentioned roll, and means to normally urge the floating roll toward the stationary roll.

9. In sheet glass apparatus, a receptacle containing a mass of molten glass, a pair of rolls mounted thereover and arranged to create a sheet forming pass, one of said rolls being supported in a stationary self-aligning mounting, linkage means for supporting the other roll in a manner that it may float toward and away from the first mentioned roll, means to normally urge the floating roll toward the stationary roll, and means for limiting the approach of the floating roll toward the stationary roll.

10. In sheet glass apparatus, a receptacle containing a mass of molten glass, a pair of rolls mounted thereover and arranged to create a sheet forming pass, one of said rolls being supported in a stationary self-aligning mounting, linkage means for supporting the other roll in a manner that it may float toward and away from the first mentioned roll, means to normally urge the floating roll toward the stationary roll, means for limiting the approach of the floating roll toward the stationary roll, and means for indicating the space between the rolls.

11. In sheet glass apparatus, a receptacle containing a mass of molten glass, a pair of rolls mounted thereover and arranged to create a sheet forming pass, one of said rolls being supported in a stationary mounting, linkage means for supporting the other roll in a manner that it may be free to move toward and away from the stationary roll, means for controlling the space between said rolls, and means for moving the two rolls as a unit longitudinally with respect to the mass of molten glass.

12. In sheet glass apparatus, a receptacle containing a mass of molten glass, a pair of rolls mounted thereover and arranged to create a sheet forming pass, one of said rolls being supported in a stationary mounting, linkage means for supporting the other roll in a manner that it may be free to move toward and away from the stationary roll, means for controlling the space between said rolls, and means for moving the two rolls as a unit vertically and longitudinally with respect to the mass of molten glass.

13. In sheet glass apparatus, a receptacle containing a mass of molten glass, a pair of rolls mounted thereover and arranged to create a sheet forming pass, one of said rolls being supported in a stationary self-aligning mounting, linkage means for adjustably supporting the other roll in a manner that it will be free to move toward and away from the first roll, said linkage means being capable of being locked in a position that the movable roll will be held away from the first mentioned roll, and means acting through the linkage means for normally urging the movable roll toward the stationary roll when the linkage means is not locked in open position.

14. In sheet glass apparatus, a receptacle containing a mass of molten glass, a pair of rolls mounted thereover and arranged to create a sheet forming pass, one of said rolls being supported in a stationary self-aligning mounting, linkage means for adjustably supporting the other roll in a manner that it may float toward and away from the first roll, means for controlling the space between said rolls, and a third roll supported in the stationary mounting and over which the sheet formed in the sheet forming pass is deflected into a horizontal plane.

15. In sheet glass apparatus, a receptacle containing a mass of molten glass, a pair of rolls mounted thereover and arranged to create a sheet forming pass, one of said rolls being supported in a stationary self-aligning mounting, linkage means for adjustably supporting the other roll in a manner that it may float toward and away from the first roll, means for controlling the space between said rolls, and a third roll supported in the stationary mounting and over which the sheet formed in the sheet forming pass is deflected into a horizontal plane, all of said rolls being movable as a unit both horizontally and vertically with respect to the mass of molten glass.

16. In sheet glass apparatus, a receptacle containing a mass of molten glass, a pair of rolls mounted thereover and arranged to create a sheet forming pass, one of said rolls being supported in a stationary self-aligning mounting, linkage means for supporting the other roll in a manner that it will be free to float toward and away from the stationary roll, and drive means for said rolls, the self-aligning support for the stationary roll and linkage means for the floating roll being such that the space between the rolls can be varied without affecting the linear velocity of said rolls.

17. In sheet glass apparatus, a receptacle containing a mass of molten glass, a pair of rolls mounted thereover and arranged to create a sheet forming pass, one of said rolls being supported in a stationary mounting, linkage means for adjustably supporting the other roll with respect to the first, means for controlling the space between said rolls, a third roll mounted above the first two mentioned rolls, the formed sheet of glass being passed vertically up and around the third roll, and means for conveying the sheet horizontally away from said third roll.

18. In sheet glass apparatus, a receptacle containing a mass of molten glass, a pair of internally cooled rolls mounted in contact with the surface of the molten glass and arranged to create a sheet forming pass, linkage means for adjustably supporting one of said rolls with respect to the other, means for controlling the space between the rolls, a third roll mounted above the first two mentioned rolls, a horizontal conveyor disposed laterally of the third roll, the sheet of glass being passed vertically from the sheet forming pass, deflected over the third roll, and carried horizontally therefrom over said conveyor.

19. In sheet glass apparatus, a receptacle containing a mass of molten glass, a pair of rolls mounted thereover and arranged to create a sheet forming pass, one of said rolls being supported in a stationary mounting, linkage means for adjustably supporting the other roll with respect to the first, and means for controlling the space between said rolls.

20. In sheet glass apparatus, a receptacle containing a mass of molten glass, a pair of rolls mounted thereover and arranged to create a sheet forming pass, one of said rolls being supported in a stationary mounting, linkage means for adjustably supporting the other roll with respect to the first, means associated with the linkage means for normally urging the movable roll toward the stationary roll, and adjustable means for controlling the space between said rolls.

21. In sheet glass apparatus, a receptacle containing a mass of molten glass, a pair of rolls mounted thereover and arranged to create a sheet forming pass, one of said rolls being supported in a stationary mounting, linkage means for supporting the other roll in a manner that it will be free to automatically move toward and away from the stationary roll, means for limiting the approach of the adjustable roll with respect to the stationary roll, and means for normally urging the adjustable roll toward the stationary roll as far as the adjustment of the last mentioned means will permit.

22. In sheet glass apparatus, a receptacle containing a mass of molten glass, a pair of rolls mounted thereover and arranged to create a sheet forming pass, one of said rolls being supported in a stationary mounting, linkage means for supporting the other roll in a manner that it may be free to move toward and away from the stationary roll, means for controlling the space between said rolls, and means for moving the two rolls as a unit vertically with respect to the mass of molten glass.

23. In sheet glass apparatus, a receptacle containing a mass of molten glass, a pair of rolls mounted thereover and arranged to create a sheet forming pass, linkage means for adjustably supporting one of said rolls, and means for controlling the space between said rolls.

24. In sheet glass apparatus, a receptacle containing a mass of molten glass, a pair of water-cooled rolls disposed thereover and arranged to create a sheet forming pass, linkage means for adjustably supporting one of said rolls, means for normally urging said roll toward the other, and means for controlling the space between said rolls.

25. In sheet glass apparatus, a receptacle containing a mass of molten glass, a pair of rolls mounted thereover and arranged to create a sheet forming pass, one of said rolls being supported in a stationary mounting, linkage means for adjustably supporting the other roll with respect to the first, means for applying pressure to the adjustably mounted roll to urge it toward the stationary roll, means for controlling the space between the rolls, and means for moving the rolls as a unit to and from the mass of molten glass.

26. In sheet glass apparatus, a receptacle containing a mass of molten glass, a pair of rolls mounted thereover and arranged to create a sheet forming pass, the rolls being so mounted that a straight line through their axes will be substantially horizontal, linkage means for adjustably supporting one of said rolls, which roll is free to move away from the other roll, adjustable means for controlling the approach of the adjustable roll toward the other roll, and means for normally holding the adjustable roll as close to the other roll as said adjustment permits.

27. In sheet glass apparatus, a receptacle containing a mass of molten glass, a pair of rolls mounted thereover and arranged to create a sheet forming pass, one of said rolls being supported in a stationary mounting, linkage means for adjustably supporting the other roll with respect to the first, the adjustable roll being free to move away from the stationary roll, means for limiting the movement of the adjustable roll toward the stationary roll, means for normally urging the adjustable roll toward the stationary roll, and means for moving the two rolls vertically.

Signed at Toledo, in the county of Lucas, and State of Ohio, this 12th day of February, 1929.

CARROLL CONE.
EDWIN A. ROSIN.